United States Patent [19]

Kaun

[11] Patent Number: 5,162,172
[45] Date of Patent: Nov. 10, 1992

[54] BIPOLAR BATTERY

[75] Inventor: Thomas D. Kaun, New Lenox, Ill.

[73] Assignee: ARCH Development Corporation, Chicago, Ill.

[21] Appl. No.: 628,638

[22] Filed: Dec. 14, 1990

[51] Int. Cl.$^5$ .............................................. H01M 6/46
[52] U.S. Cl. ......................................... 429/155; 429/174; 429/185; 429/210
[58] Field of Search ............... 429/112, 152, 153, 154, 429/155, 174, 185, 210

[56] References Cited

U.S. PATENT DOCUMENTS

| | | |
|---|---|---|
| 4,292,380 | 9/1981 | O'Boyle et al. ................... 429/101 |
| 4,609,598 | 2/1986 | Tuchaski et al. ................... 429/174 |
| 4,687,717 | 8/1987 | Kaun et al. ........................ 429/152 |
| 4,800,143 | 1/1989 | Harbach et al. ................... 429/153 |
| 4,851,806 | 7/1989 | Kaun et al. ........................ 429/112 |

Primary Examiner—William R. Dixon, Jr.
Assistant Examiner—Chris Gallo
Attorney, Agent, or Firm—Reinhart, Boerner, Van Deuren, Norris & Rieselbach

[57] ABSTRACT

A bipolar battery having a plurality of cells. The bipolar battery includes: a negative electrode; a positive electrode and a separator element disposed between the negative electrode and the positive electrode, the separator element electrically insulating the electrodes from one another; an electrolyte disposed within at least one of the negative electrode, the positive electrode and the separator element; and an electrode containment structure including a cup-like electrode holder.

23 Claims, 4 Drawing Sheets

BIPOLAR BATTERY

BACKGROUND OF THE INVENTION

This invention is concerned generally with bipolar battery structures and more particularly is directed to a bipolar battery which accommodates electrolyte volume changes during battery cycling, allows easy assembly of a large number of cells and includes corrosion resistant sulfide ceramic seals.

Current lithium alloy/iron sulfide bipolar batteries have positive and negative electrode materials which are confined relative to the collectors of positive and negative current. The current collectors are electrically insulated from one another by a separator element. Typically, the negative electrode material is a lithium alloy, such as, LiAl or LiSi, and the positive electrode material is an iron sulfide, such as, FeS or $FeS_2$. The separator elements are formed of a fibrous boron nitride, a pressed powder magnesium oxide or an aluminum nitride. An electrolyte, such as a lithium chloride, lithium bromide and potassium bromide mixture, is present in the electrode materials and the separator element. The positive and negative current collectors are commonly formed of electrically conductive sheets that also confine the electrode materials.

A substantial amount of development work has been performed in the area of high-temperature, secondary electrochemical cells. Positive electrodes for these cells have included chalcogens, such as sulfur, oxygen, selenium or tellurium and further have included transition metal chalcogenides.

In high-temperature cells, current flow between electrodes often is accomplished by means of molten electrolytic salts. Particularly useful salts include compositions of the alkali metal halides and/or the alkaline earth metal halides which ordinarily incorporate a salt of the negative electrode reactant metal, e.g., lithium. In cells operating at moderate temperatures, aqueous and organic base electrolytes are permissible, and these also can include cations of the negative electrode metal.

Alkali metals such as, lithium, sodium, potassium, or alkaline earth metals, including calcium and magnesium and alloys of these materials, are contemplated as negative electrode reactants. Alloys of these materials, such as lithium-aluminum, lithium-silicon, lithium-magnesium, calcium-magnesium, calcium-aluminum, calcium-silicon and magnesium-aluminum, have been utilized to maintain the negative electrode in solid form and thereby improve retention of the active material at high cell operating temperatures.

Full size batteries are comprised of many cells grouped together in an end-to-end, or face-to-face, arrangement in a common battery housing and are electrically connected in series to produce higher effective voltage output. A thin cell version is capable of very high current density, and the battery is designed to operate at temperatures in the range of 375°-500° C. The electrode materials and also the electrolyte are quite corrosive at these operating temperatures so that the current collectors must be corrosion resistant, yet must function as electrically conductive material. Moreover, the battery is intended to have an operating life in excess of one thousand "deep discharge" cycles, where each such cycle involves discharging the fully charged battery to approximately a 5% charge level before recharging again. During this deep discharge cycling, the positive and negative electrode materials undergo volumetric changes at different rates. This difference in volume change can shift the electrode materials relative to one another within the battery cell or can even deform the separator elements.

Another major problem in existing bipolar battery designs, particularly those involving electrolytes normally fluid at cell operating temperatures (i.e., 375°-500° C.), has been electrolyte leakage past the wetted separator element present between the adjacent positive and negative electrodes. The electrolyte is consumed by electrolytic decomposition and could produce metallic deposits sufficient to cause battery failure by shorting out the adjacent collectors or shorting to the external battery housing.

Compression bonding of sandwiched plate-like cell components within the battery case is currently used in many bipolar batteries as the primary means to maintain the edge of the separator elements sealed. This is accomplished prior to introduction of electrolyte to the cells. U.S. Pat. No. 4,687,717 (incorporated by reference herein) describes various approaches to hermetic sealing of the bipolar battery by forming thermal compression seals for each cell. The required degree of compression for seal formation has limited the design flexibility for improving battery performance and for improving the economics of battery fabrication.

It is therefore an object of the invention to provide an improved design for a bipolar battery.

It is another object of the invention to provide a new bipolar battery with leak proof sulfide ceramic seals of the positive and negative electrode materials.

A further object of the invention is to provide an improved bipolar battery cell in which seals adjacent the electrolyte cavity or chamber are formed prior to the addition of electrolyte.

It is yet another object of the invention to provide an improved battery design having a repeating, cup-like design which allows the battery components to be assembled incrementally from the open end of a sealed structure.

A further object of the invention is to provide an improved bipolar battery cell in which the telescoping seal elements capture the periphery of the separator of the cell element to enhance cell durability.

It is still an additional object of the invention to provide a new battery containment design having the positive and negative current collecting containment elements of adjacent cells sharing a common bipolar current collector to provide a series electrical cell connection.

It is yet a further object of the invention to provide a novel battery current-collector element which connects the dispersed current-collector to the planar current-collector via a conductive ceramic transition element to significantly reduce interfacial resistance.

It is yet a further object of the invention to provide a novel battery current-collector element which is displaceable to accommodate changes in electrode volume during electrical charging and discharging cycles.

It is yet another object of the invention to provide an improved bipolar battery structure having refractory metal coated steel components for containing the electrodes.

It is still an additional object of the invention to provide an improved bipolar battery structure having a combination of external ceramic rings and sealants which encapsulate the battery to resist humidity and provide electrical insulation.

It is yet an additional object of the invention to provide a method for forming high strength bonds between metals (especially refractories) and sulfide ceramics or solder glasses by modifying the bond interface to form an intermetallic material such as an aluminide, silicide or phosphide.

SUMMARY OF THE INVENTION

This invention is directed in part to an enclosure for individual electrochemical cells of a bipolar battery and more particularly to a lithium metal/iron sulfide battery wherein a plurality of cells are placed in an end-to-end arrangement in a containment structure. The enclosure comprises a pair of spaced-apart metal components with an outer insulating member between and sealed to the metal components to enclose the active cell components and form a cell cavity.

In a preferred embodiment, the battery containment structure includes lateral extensions protruding beyond the insulating member. These lateral extensions are shaped to form cup-like electrode holders with opposite open ends to receive electrodes in the cavity. The cup-like holders have a refractory metal coating on a steel substrate and intermetallic phases, such as $Mo_3Al$, are formed with sulfide sealants used to bond metals to ceramics used in the containment structure. The individual cell enclosures are completed by sealing a metal current collector, or an end face cup, to the open ends of the containment structure. A fluid electrolyte can be added within one electrode holder to flow into the cavity, or the electrolyte can be a material which becomes fluid at elevated temperatures, flows into the cavity and act as an electrolyte.

The bipolar battery includes an array of cells and associated cell enclosures. Individual current collectors are sealed to adjacent open ended cell holders of adjacent cells. The collective cell enclosures are means for isolating each cell and the plurality of cells forming the complete bipolar battery. In addition to collective cell enclosures, the bipolar battery of the invention includes a housing enclosing the array of cells and cell enclosures with means for external electrical connection to the electrically opposite ends of the battery array.

Additional details and features of the invention are set forth in the following drawings wherein like elements have like numbers throughout the several drawings.

DETAILED DESCRIPTION OF PREFERRED EMBODIMENTS

As described herein, the bipolar battery of the invention comprises a plurality of individual cells in a stacked array. Electrically opposite electrode ends are adjacent each other in the array, and electrically conductive end face caps are in contact with electrode ends of the array. Each cell generally includes a pair of electrically opposite electrodes in contact with and separated by a separator element. The array includes (1) a current collector between and in electrical contact with adjacent electrodes of adjacent cells, and (2) means for isolating each cell from adjacent cells including a cup-like container with outer metallic perimeters in a spaced apart arrangement to enclose the electrodes of the cell and permitting an electrode-electrolyte interface for ionic transport. Each such cup-like container has side walls forming an open end attached in sealing engagement with an adjacent current collector element or an end face cap. An insulating member is disposed between and is in sealing engagement with the cup-like containers which enables enclosure of the electrolyte within the cell. A housing encloses the cell array with means for external electrical connection provided for the electrically opposite ends of the cell array.

Figure 1:
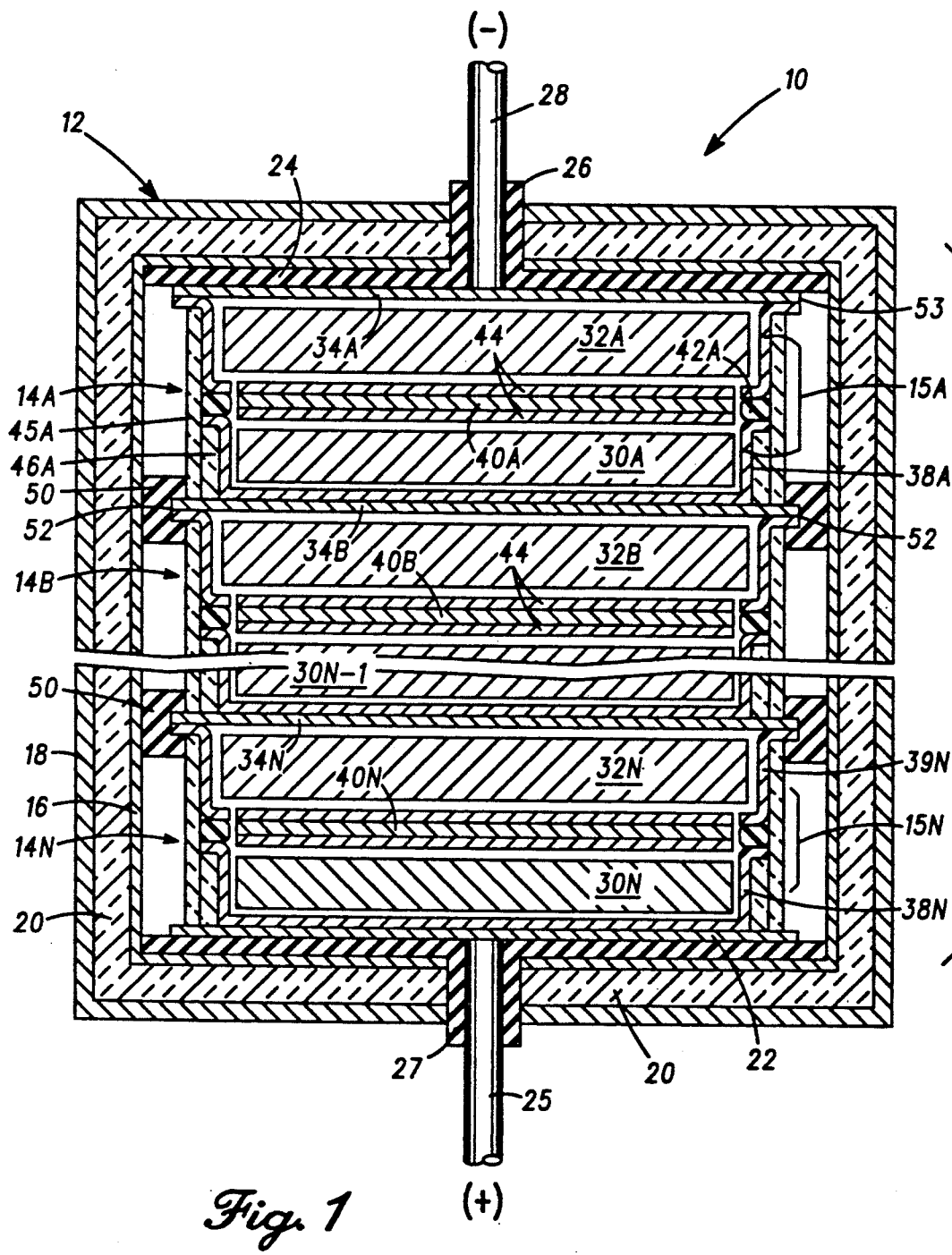
FIG. 1 is a cross sectional view of a bipolar battery having a plurality of cells.

As shown in FIG. 1, a high power lithium alloy/iron sulfide battery 10 is shown and has a housing 12 and individual cells 14A, 14B, . . . , 14N. The individual cells 14 are located within the housing 12 in a stacked positive (+) to negative (−) serially arranged fashion. The housing 12 is formed of inner and outer walls, 16 and 18, respectively; and these walls 16 and 18 are separated from one another by thermal insulation 20. The battery 10 as shown in FIG. 1 is not grounded. The cell 14N is connected to positive terminal 25 with electrically insulating feedthrough 27 via its anode current collector (as an end face cap 22). The top cell 14A is connected to negative terminal 28 via its cathode current collector (as an end face cap 24) with an electrically insulating feedthrough seal 26. In this illustrated arrangement, the voltage across the positive and negative terminals, 25 and 28, respectively, would be the cumulative voltage of the cells 14A-N in the housing 12.

Each cell 14A, 14B, . . . , 14N used in the construction of the battery 10 of FIG. 1 has an associated anode 30A, 30B, . . . , 30N and an associated respective cathode 32A, 32B, . . . , 32N, separated from one another across an associated separator element 40A, 40B, . . . , 40N. Current conductors (24, 34A, 34B, . . . , 34N and 22) sandwich the outer sides of the anodes 30 and cathodes 32. A peripheral seal module 15 includes a pair of spaced apart electrically conductive elements (38A, 38B, . . . , 38N and 39A, 39B, . . . , 39N) which are immediately adjacent the associated anode or cathode electrode. An insulating member is illustrated as a spacer element 42A, 42B, . . . , 42N which is annularly disposed around the separator element 40 and sandwiched between the electrically conductive elements 38 and 39. Various conventional insulating materials, preferably with high temperature and chemical stability properties, can be used for the spacer element 42. For example, the insulating member can be a sulfide ceramic composite, which bonds together the peripheral conductive elements 38 and 39.

The peripheral seal module 15 having the conductive elements 38 and 39 encompasses the side edges of the electrodes 30 and 32 to form a cup-like shape. The bottom of the cup-like conductive elements 38 and the top flange piece of the current conductor 34 are fused or otherwise permanently bonded preferably under vacuum at joint 52 to enclose and seal each of the respective cells 14. Each of the cells 14 is therefore sealed from the exterior on the one face by the current conductor 34 and on the edges by the peripheral seal module 15.

A ceramic support ring 45 further encompasses the upstanding portions of the peripheral seal components (the conductive elements 38 and 39 and the spacer element 42). The cell 14 is further bonded at its inner surface with a ring of sealant means 46 which is perferably a sulfide ceramic potting composition. A completed internal seal structure thus includes three metal components (34, 38, and 39), and three ceramic components (42, 45, 46) are bonded into a single unit with a single operation, such as thermal bonding. A water-stable ceramic sealant, such as MgO with silane binder, is applied at the interstices of support rings 45 over fusion bond 52 to finally encapsulate the battery stack.

When the battery 10 is assembled, a plurality of cells 14A, 14B ..., 14N are stacked on one another and are sealed. Each of the adjacent cells 14 will have common current collectors between the cathode and anode materials of the different adjacent cells 14. See, for example, current conductor (collector) 34A between the anode 30A of the cell 14A and the cathode 32B of the cell 14B. The stack of such cells 14 is normally confined in a gas-tight pressure form of the housing 12.

The individual cell assembly described herein is particularly advantageous for the cells 14 with thin electrodes and electrolyte separators made by tape casting methods. These cells can be characterized by diameters in the range of fifty to five hundred times the thickness of the cell 14, including the anode 30, the cathode 32 and the separator element 40.

Prior to the assembly operation, electrolyte (not shown) has been infused into the anodes 30, the cathodes 32 and the separator element 40 by any of several known techniques. One infusion technique involves melting electrolyte particles with particles of the electrodes and with particles of the separator elements followed by cold-pressing into plaques. The electrolyte can then pass by ionic conductance across the separator element 40 between the anode 30 and the cathode 32.

In a preferred embodiment, the cell 14 also includes particle retainer sheets 44 shown in FIG. 1. These materials are otherwise confined or sealed from the exterior as shown in FIG. 1.

In addition to the sealed joints, the stacked cells 14 are maintained in a compressed state by means of its abutment against the opposite walls of the housing 12. A layer 50 of insulating material is also preferably interposed between current collectors 34 of the cells 14A and 14N and the inner wall 16 of the housing 12.

The invention further involves the use of new sealant materials to enhance manufacturability and flexibility of materials selection for non-aqueous bipolar batteries. The illustrated Li-alloy/FeS$_2$ molten-salt electrolyte battery 10 includes such sealants. The commercial viability of this battery 10 depends on the ability to fabricate a durable battery using molybdenum components. The option to substitute less costly materials to replace molybdenum is highly desired. The design for a sealed bipolar Li-alloy/FeS$_2$ battery disclosed in U.S. Pat. No. 4,687,717 requires the bipolar battery to be constructed entirely of molybdenum metal components. Such a construction requires a difficult (and not highly durable) Mo to Mo weld to unitize the assembled battery. This earlier bipolar battery design used thermal compression techniques in forming the critical metal-to-ceramic, peripheral seal. The thermal/compression bonding is uniaxial which limits the design options for the peripheral seal.

As described herein the fabrication of a cup-like peripheral seal component (see FIG. 2) significantly reduces the amount of molybdenum required for fabrication of the Li-alloy/FeS$_2$ bipolar battery 10. Also, the welding difficulties associated with the use of molybdenum above are alleviated.

Figure 2A:
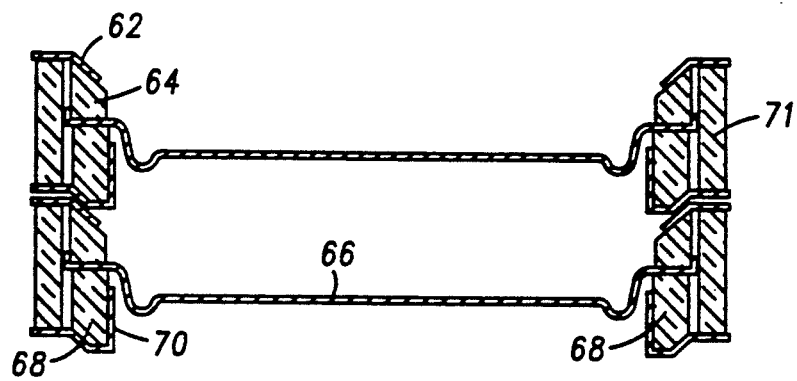
FIG. 2A shows a cross sectional and exploded view of a single bipolar plate "cup type" battery cell and FIG. 2AA shows an exploded view of the cell of FIG. 2A.
Figure 2A:
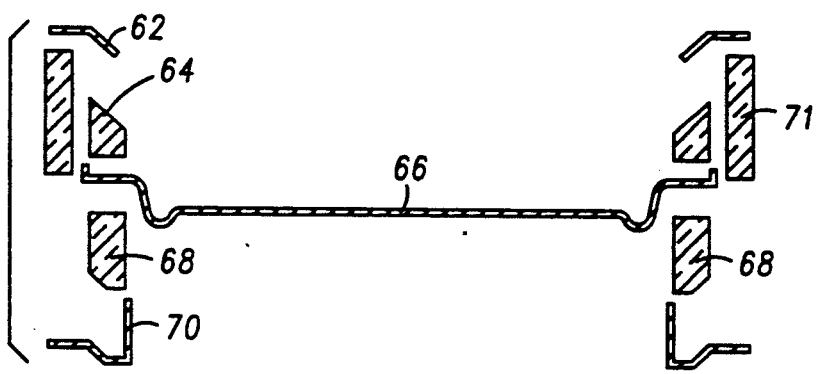

As shown in FIG. 2A, the bottom of the cup-like seal component is a shallow molybdenum cup 66, or a bipolar plate, for the FeS$_2$ electrode compartment. The cup 66 provides a diaphragm, or a reciprocating, action during battery cycling, and will be described in more detail later. In addition, the cup 66 electrically connects the cell 14 to the next one in the stack and aligns components for seal formation. An open ring 62 at the opposite side of the seal forms the negative Li-alloy electrode compartment and can be made of steel. The sulfide ceramic seal rings 64 and 68 enables sealing in all axes to envelop the edges of the bottom (the FeS$_2$ compartment) of the molybdenum cup 66. The peripheral seal ring 64 is one of the sulfide ceramic seals which bonds the negative to positive compartments, electrically isolating the two compartments. The shallow cup 66 can also be a corrosion-protected ferrous alloy component (e.g., TiN-coated steel or conductive sulfide ceramic coated steel using the sulfides disclosed in patent application Ser. No. 07/582,525 incorporated by reference herein. The cup 66 also can incorporate corrosion-resistant liners (e.g., grafoil or Mo foil) over steel. Thus, the Li-alloy/FeS$_2$ bipolar battery 10 can be fabricated without any molybdenum components. The peripheral sulfide ceramic seal also incorporates an external steel flange 70 as part of the FeS$_2$ bipolar battery 10 and can be fabricated without any molybdenmun components. The cup-like peripheral seal 68 also incorporates the external steel flange 70 at the FeS$_2$ electrode side of the component which mates with the Li-alloy electrode side of the adjoining bipolar cell 14. An external ceramic ring 71 (e.g., MgO and Al$_2$O$_3$) is bonded to the outer perimeter of the seal structure and provides structural support, screens the cell 14 from ambient atmosphere and aids component alignment during seal formation.

This bipolar battery construction facilitates assembly and unitizing of the bipolar battery cell stack by a conventional steel-to-steel welding operation in assembling elements 62-70. Selected properties of the sulfide ceramics permits much easier seal formation with multiple metal and ceramic components. For example, these properties include a temperature of fusion $\leq 1100°$ C. with aggressive wetting onto most metal and ceramics and virtually no concern for strict temperature controls which are necessary to avoid devitrification of glassy type sealant materials. Thus, earlier difficulties of bipolar battery fabrication are overcome by the broad design flexibility of the peripheral seal with the sulfide ceramics in the manner described herein.

Large diameter peripheral seal design is very much concerned with the respective coefficient of thermal expansion (CTE) of mating components. The peripheral seals are generally formed at 800°–1100° C., cooled to ambient temperatures and then used in the battery 10 at 400° C. The ability to replace the molybdenum current collector 66 with a steel component (having substantial corrosion resistance) reduces the stress arising from the CTE which must be absorbed by the peripheral seal structure. The edges of coated materials are typically the locations of a breach in a coating because the stress from CTE mismatch of coating and substrate is greatest at the edges. Therefore, by incorporating edges of coated materials within the peripheral seal, the concern of a breach in the coating at a component edge is eliminated. In addition, the requirement for attaching the coated metal to another metal component (while still maintaining the coating) is eliminated. Selected suitable coatings for protecting ferrous alloys from high sulfur activity are, for example, molybdenum, tungsten, titanium nitride and conductive sulfide ceramics. Conductive sulfide ceramics (see pending patent application assigned to the assignee of the present application and having Ser. No. 07/582,525 and incorporated by reference herein) can be engineered to attain a desired CTE.

The viability of a low-cost substrate with a corrosion-protection layer is an important factor for commercial acceptance of the high-temperature bipolar battery. In this design of the bipolar battery 10, the positive electrode requiring corrosion protection is loaded into the bottom compartment of the cup-like peripheral seal. The separator element 40 (the electrolyte matrix) is then assembled above the positive electrode 30 with its outer perimeter being enclosed by the electrically insulating sulfide ceramic ring 42 comprising the peripheral seal. The sulfide ceramic can be one of the compositions disclosed in the above referenced pending patent application. The negative electrode 32 is next loaded into the upper compartment having a steel perimeter, which is sealed to the sulfide ceramic ring 42. Both positive and negative electrodes 30 and 32 can include perforated metal faces to enhance electrolyte particle retention. The bipolar plate configuration caps the negative electrode 32, as well as attaches the positive compartment of the next series cell 14 in the bipolar stack. A perimeter weld (steel to steel), of the bipolar plate (66 in FIG. 2A) with the negative electrode perimeter ring 39 results in sealing the negative electrode compartment and causes series connection of the next consecutive cell 14 of a bipolar battery stack. Preferably, the peripheral seal is slightly recessed from the perimeter of the electrode compartment. With the separator element 40 and the particle retainer sheet 44 slightly larger in diameter than the electrodes 30 and 32, the edges of the separator element 40 are trapped as a result of the cell stacking operation. The stack assembly, with simple steel to steel welding, is a low cost assembly procedure; but the ability to obtain a durable assembly method is important for long life operation of the bipolar battery 10.

The broad flexibility in peripheral seal fabrication enables bipolar battery designs which combine conventional structural ceramics (e.g., MgO, $Al_2O_3$, BN) which are corrosion protected by coatings of sulfide ceramic (see pending incorporated application Ser. No. 07/582,525). These conventional ceramics can add structural stability to the bipolar peripheral seal component and aid in metal component alignment. When positioned externally in the peripheral seal design, the conventional ceramic seal ring 71 minimizes atmospheric exposure of hygroscopic sealant materials, such as the sulfide ceramics. Conventional oxide ceramic sealants (silicates) used externally between structural ceramic components (e.g., the ring 71) can form a double hermetic peripheral seal, that is, chemically stable internally and also stable to the ambient (e.g., humid air) of an external atmosphere.

The electrodes 30 and 32 within the bipolar battery 10 typically undergo appreciable volume changes during the course of discharge and recharge of electrochemical energy storage (cycling). The upper-plateau $FeS_2$ electrode ($FeS_2 + 2Li^+ + 2e^- \rightarrow Li_2FeS_2$) has about double the solids volume at the end of its discharge. Usually the electrodes of a Li-alloy/$FeS_2$ cell are designed to be dimensionally stable. Thus, the amount of electrolyte in the respective electrodes fluctuates during cycling.

The bipolar battery 10 illustrated herein has a reciprocating shallow cup, or the bipolar plate 66, which permits the amount of solids to fluctuate during cycling. This can be accomplished by providing selected indentations in the bottom of the cup 66, such as a circular groove or spaced indents near the perimeter of the cup bottom. The nature of this action is shown in FIG. 3. That is, within a dimensionally confined volume, as the $FeS_2$ electrode 30 expands it can borrow volume from the Li-alloy electrode which is shrinking in discharge. The $FeS_2$ electrode 30 will thus return the borrowed volume during the following recharge.

The ability to operate the battery 10 within a smaller volume and with greater performance is the primary objective of battery development. The reciprocating bipolar plate design enhances the power in Wh/liter of the battery 10. Reduced volume enables reduced weight of battery hardware components. Therefore, the battery's specific energy, Wh/kg, is also increased.

The reciprocating bipolar plate 66 (see FIG. 2A) is a thin metallic member separating positive electrode material (e.g., the $FeS_2$ electrode 30 in FIG. 1) from negative electrode material (e.g., the Li-alloy electrode 32 in FIG. 1). The bipolar plate electrically connects one cell to the next in a bipolar battery stack. As the battery cycles, the bipolar plate 66 will perform like a diaphragm and "oil can", that is, slightly pop back and forth as a result of the volume changes of the two respective electrodes 30 and 32 as the battery 10 cycles. The addition of peripheral corrugations or folds into the bipolar plate 66 further enhances this action (see FIG. 3 also). The volumetric change thus exerts stress radially upon the metal/ceramic peripheral seal. The reciprocating bipolar plate 66 alleviates the mechanical stresses and permits greater battery compactness. In addition, the corrugations or folds at the periphery of the bipolar plate 66 can perform as a locating aid for assembling a bipolar battery stack.

Figure 2B:
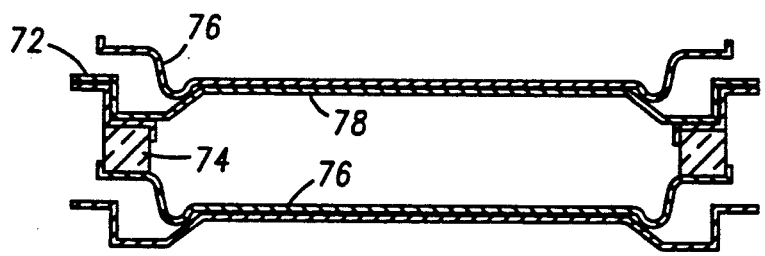
FIG. 2B is a double bipolar plate "cup type" positive side battery design and FIG. 2BB is an exploded view of the design of FIG. 2B.
Figure 2B:
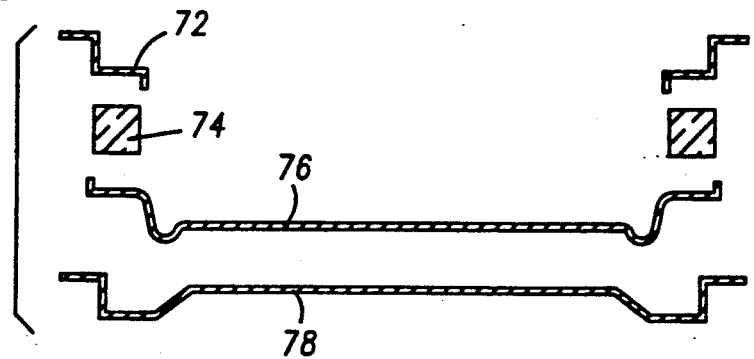

The design variation of FIG. 2B and BB simplifies component fabrication, but requires cell assembly fixturing. The primary change is a double bipolar plate 76 and 78, which is brazed with a conventional laminant, such as 90 Ag:10 Cu. As discussed previously, the positive side of the plate 76 is in cup form with its perimeter sealed into the peripheral sulfide ceramic seal ring 74. Therefore, the plate 76 can be a coated steel, a liner over steel, as well as a refractory metal, such as molybdenum. The battery assembly is accomplished with telescoping cell components, which trap the separator/retainer perimeter edge. A mode of cell failure has been electrode material working around the separator edge either in assembly and/or cell operation. The battery 10 is unitized with a perimeter weld of the steel ring 72 to the bipolar plate 78.

Figure 2C:
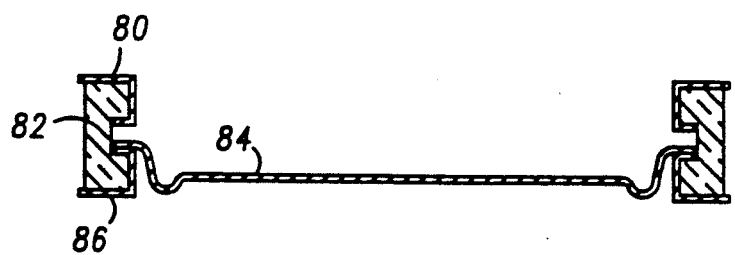
FIG. 2C is a single bipolar plate design having a ceramic support ring and FIG. 2CC is an exploded view of the design of FIG. 2C.
Figure 2C:
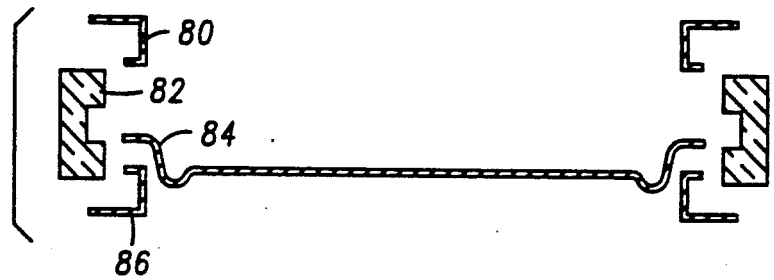

In another embodiment shown in FIG. 2C and CC component fabrication is simplified. The design is facilitated by the ability to sulfide ceramic coat an oxide structural ceramic (such as MgO, $Al_2O_3$, mullite or $SiO_2$ glass) and to directly bond metal components to the oxide ceramic via a sulfide ceramic sealant (again, see pending application Ser. No. 07/582,525). Metal components (Mo, TiN on steel, e.g.) such as negative electrode perimeter ring 80 and bipolar plate 84 with negative electrode flange 86 snap into peripheral seal ring 82. A thermal process fuses the sulfide ceramic to bond the components and coat the gap between the ring 80 and the bipolar plate 84. Rather than inserting the cell component as pellets, the electrode/separator materials are sequentially poured into the peripheral seal component where the materials are pressed or slurry formed into layers using the seal as the ring of a die set. The individual cells 14 are stacked in a fixture to obtain a perimeter weld 80 to the negative electrode flange 86. A silica based ceramic sealant is applied over the exposed perimeter weld 80 to encapsulate the battery stack from humid ambient.

Figure 2D:
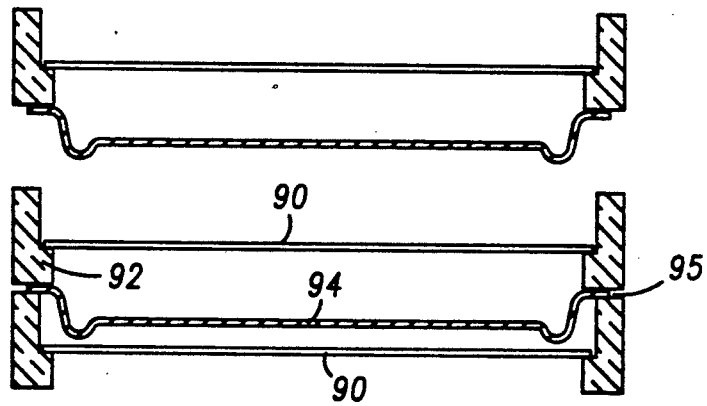
FIG. 2D is a bipolar battery design for a liquid electrode with solid electrolyte and FIG. 2DD is an exploded view of the design of FIG. 2D.
Figure 2D:
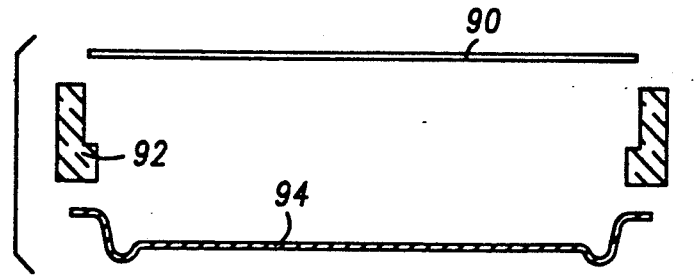
Figure 2E:
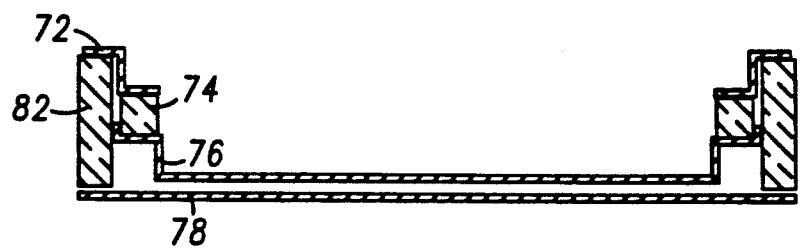
FIG. 2E is a simplified form of FIG. 2B.

In the embodiment of FIG. 2D and DD, a rigid separator member 90 (such as a solid electrolyte element, e.g., $\beta''$ alumina, or other Na ion, conductor element) is fused into a peripheral seal ring 92 (such as an alumina of sulfide ceramic/alumina composition) using a sulfide ceramic sealant. Cell/battery assembly is further simplified by stacking the electrodes (entering from both sides of the separator member/seal ring 90/92 with bipolar plate 94. The bipolar plate 94 can be steel with a coating (such as a laminate of conductive sulfide ceramic and coated Al) or liner at the positive electrode side or molybdenum. With a fixture to align the cells 14, battery assembly is achieved by fusing a sulfide ceramic sealant 95 by localized heating (e.g., using a laser) between the peripheral seal rings 92 of the consecutive cells 14. The battery 10 can be further sealed by a conventional silicate based ceramic coating.

In cell systems with liquid electrodes, such as Na/S or Na/metal chloride, the electrode volume changes from battery cycling are even more extreme than the Li-alloy/FeS battery example. The Na electrode literally evacuates and refills during cycling. The reciprocating bipolar plate feature described previously greatly reduces unused battery volume in such a system.

Even though the battery includes the reciprocating bipolar plate 94, intimate contact is still maintained for the electronic path within the electrodes and the bipolar plate 94. In conventional designs, a dispersed current-collector within the electrode (e.g., carbon fiber matrix) is not attached to the current-collector and the bipolar plate 94. In this design the electrode materials fill up around the dispersed current collector and no loss of contact between dispersed and planar current-collector occurs. In the reciprocating bipolar design, electrically-conductive sulfide ceramics bond the dispersed current-collector to the bipolar plate. In addition, ionically-conductive sulfide ceramics are used to bond dispersed current-collectors or dispersed ion-conductors to the electrolyte layer.

Figure 3A:
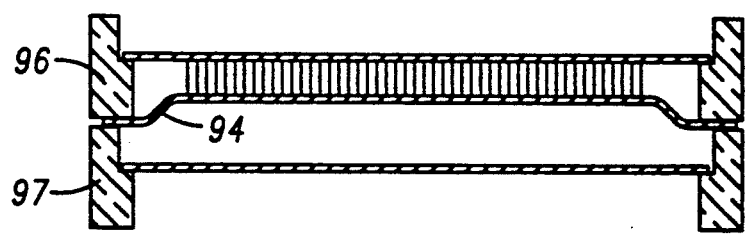
FIG. 3A shows a cross sectional view of a dispersed current collector in a charged state and is connected to planar electrolyte surfaces and a bipolar plate with diaphragm action and FIG. 3B shows the collector in the discharged state.
Figure 3B:
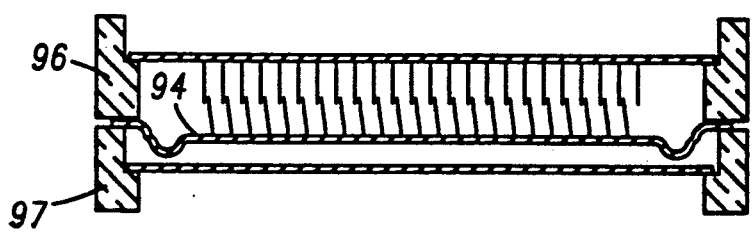

One can view the ionic and electronic matrices within the electrode as interlocked combs disposed face to face, and the teeth of these combs slip back and forth as the electrode volume expands and contracts, as shown in FIG. 3. During the cycling electronic and ionic conductor paths within the electrode are maintained. In FIG. 3A positive electrolyte (sulfur) 96 is coupled via the bipolar plate 94 to negative plate (sodium) 97. FIG. 3A is the charged state and 3B the discharged state.

The chemical stability (i.e., inertness to sulfur) of refractory metals likewise inhibits bonding of metallic refractories, such as Mo or W, with ceramic bonding agents. Typically metal/ceramic bonds are achieved with conventional brazes, as described in M. M. Schwartz, *Ceramic Joining*, pp. 103-106 ASM International Materials Park, Ohio (1990). These brazes are not chemically stable to advanced-battery materials. While the sulfide ceramics are found to bond well with molybdenum, the addition of a layer of aluminum at the bond interface has resulted in further significant improvement of the bond strength of sulfide ceramic to molybdenum (see Table I which provides comparative data). Whereas the prior art teaches the application of Al as an adhesive at about 600° C., Al in this application forms an intermetallic to modify the surface of the molybdenum. As revealed by conventional metallography, a Mo-Al phase is formed. It is believed that, a $Mo_3Al$ phase results from Al diffusing into the molybdenum at 1100° C. The $Mo_3Al$ phase has a melting point of 2000° C. and would not be expected to form at such low temperatures. The increased reactivity of the molybdenum with aluminum surface modification leads to a very strong bond with the sulfide ceramics such that a surface layer of molybdenum (a planar crystalline layer) is peeled away in bond strength tests.

Whereas other approaches to seal formation with refractory metals use adhesives, such as metal brazes or oxide-based solder glasses (e.g., $B_2O_3$ glass), the formation of an intermetallic with the refractory metal will also increase the reactivity of refractory metal with these more conventional sealant materials (see Table I). Rather than forming an adhesive interface, the formation of a bond between the ceramic and the refractory metal substrate is much stronger with the ability to withstand stresses due to differences in coefficients of thermal expansion. This is the reason that state of the art hermetic, metal ceramic seals, are limited to $\leq 12$ mm diameter molybdenum center posts. Other reactive metals, such as Si or P, can form intermetallics with metals of interest when forming seals and can be used in non-aqueous bipolar battery fabrication and used for surface modifiers to improve bonding for non-battery applications.

EXAMPLES

The following non-limiting examples illustrate the details of constructing and testing bipolar batteries characteristic of the invention.

Example 1—Bond Strength Measurements

A group of samples was prepared to test shear force required to rupture bonded surfaces. These samples consisted of two strips about 1.0 cm wide which are bonded at an overlap of 0.3 to 2.0 cm² area. The bond is prepared by applying the ceramic sealant material to the overlap area. The samples are heated to 1100° C. (in Ar) to fuse the ceramic. A 5-10 g weight is placed over the seal area to maintain positioning.

After bonding the sample strips are fixtured from both ends such that progressively greater weight can be applied to the hanging sample. Care is taken to eliminate any impact force by the weight additions. Since there is no generally accepted test procedure for measuring shear strength of bare surfaces, these measurements are relative values.

As shown in Table I, the bond strengths were generally outstanding for samples using the sulfide ceramic to form bonds between metals and ceramics. Generally, samples with smaller bond areas had to be produced such that the bond with the substrate would rupture before the substrate would fracture. These bond strengths support broad flexibility for design of bonded structures involving steel, coated steel, molybdenum, MgO, $Al_2O_3$ and carbon. Conventional brazes and welding do not enable joining of such diverse materials. The sulfide ceramics exhibit physically strong bonding to form structures with refractory metals, ferrous base metals, oxide ceramics, nitrite ceramic coating and carbon.

The bond strength tests reveal the significant improvement in bonding refractory metals, such as Mo, by formation of an $Mo_3Al$ intermetallic, as determined by metallography. A seven-fold improvement is exhibited for the sulfide ceramic bond to molybdenum. Even strong bonding of tungsten is demonstrated. A three-fold improvement is measured for the borosilicate glass bond.

The sulfide ceramic bond to metals and to ceramics is sufficiently strong that direct bonding of metal/ceramic is achieved, that is, bonded by a thin film of sulfide ceramic. For steel and MgO, whose CTE differ by about 20%, a bond strength of greater than 35 $kg/cm^2$ is similar to bond strengths achieved for oxide ceramics and refractory metals. The bond strength with sulfide ceramic exceeds that of commercial ceramic bonding agents by at least 10-20 fold.

TABLE I

| | Tensile Strength of Bonded Surfaces | | |
|---|---|---|---|
| Bond Couple | Surface Area ($cm^2$) | Load to Shear Fracture ($kg/cm^2$) | Comment |
| Mo/sulfide sealant*/Mo | 2.0 | 3.2 | |
| Mo/sealant w/ $SiS_2$/Mo | 0.38 | 11.0 | |
| Mo/sulfide sealant/Mo ($Mo_3Al$ intermetallic formed) | 0.5 | 23.0 | Much improved |
| Mo/sulfide sealant/grafoil ($Mo_3Al$ intermetallic) | 0.5 | 3.55 | Grafoil tore before rupture |
| $Al_2O_3$/sulfide sealant/$Al_2O_3$ | 0.72 | 19.76 | |
| MgO/sulfide sealant/MgO | 1.0 | >15 | MgO fractured before bond |
| | 0.5 | >35.5 | |
| MgO/sulfide sealant/MgO | 0.4 | 52.875 | |
| TiN-coated steel/sulfide sealant/TiN coated steel | 0.5 | >16.7 | Substrate tore before bond |
| Aluminized steel/sulfide sealant/Aluminized steel | 0.5 | >50 | |
| Steel/sulfide sealant/MgO | 0.48 | >35.6 | MgO fractured before bond |
| Aluminized steel/sulfide sealant/MgO | 1.5 | 13.0 | |
| steel/sealant with $SiS_2$/steel | 0.36 | 21.5 | |
| steel/sulfide sealant/steel | 0.50 | 10.7 | |
| Tungsten/sulfide sealant/tungsten | 1.0 | 3.88 | |
| Mo/borosilicate glass/Mo | 0.5 | 3.47 | |
| Mo/borosilicate glass/Mo ($Mo_3Al$ intermetallic) | 0.5 | 10.71 | Moly aluminized prior to glass application |
| Steel/commercial bonding agent Aremco 565/MgO | 1.5 | 1.4 | Other Aremco bonging agent agents failed before load test |
| Tungsten/sulfide | 1.0 | >4.5 | Tungsten strip |

TABLE I-continued

| | Tensile Strength of Bonded Surfaces | | |
|---|---|---|---|
| Bond Couple | Surface Area ($cm^2$) | Load to Shear Fracture ($kg/cm^2$) | Comment |
| sealant/tungsten (Aluminide intermetallic formed) | | | ruptured before bond |

*sulfide sealant is $CaAl_2S_4$

Example 2—Peripheral Seal Structure with Mo Current Collector

A bonded structure combines metal and ceramic components by a single thermal processing. As shown in the design of FIG. 2A, the steel ring 70 is attached to the molybdenum cup 66 via the "graded CTE" ceramic ring 68 (of pressed powders) which is composed of two layers of sulfide ceramic composite: $CaAl_2S_4$ with 44 wt. % $Al_2S_3$ at the steel side and $CaAl_2S_2$ with 18 wt. % CaO at the Mo side. A layer of aluminum is placed at the Mo/sulfide ceramic interface. A MgO ring is positioned with close inside diameter tolerance around these three components. A ceramic "potting" composition $CaAl_2S_4$ with 10 wt. % CaO is loaded into the annulus between the MgO ring and the other components. A negative electrode flange ring with an additional sulfide ceramic ring is placed on top. Using a small weight (about 5 $g/cm^2$) to maintain component positioning, the assembly is heated to 1100° C. for ¼ hour in an Argon atmosphere furnace to fuse the sulfide ceramics. The components are unitized with bonding in all axes, from horizontal to vertical axes, as revealed by metallography. Additionally, a molybdenum/aluminum intermetallic phase (probably $Mo_3Al$) is observed, and this phase intrudes into the molybdenum substrate. The multiple axes of metal to ceramic bonding promotes fracture toughness, and the formation of the Mo/Al phase (as shown in Table I) significantly improves bond strength.

To assemble the battery stack, the active component pellets include: 1) a positive electrode ($FeS_2$ and electrolyte), 2) MgO powder and electrolyte and 3) a negative electrode (Li alloy powder and electrolyte) which are stacked and inserted into the bipolar peripheral seal. Retainer screens have been inserted between the electrodes and separator elements. The stacked cells mate in a self-aligning fashion, and the edges of separator pellet and retainer screens are pinched by the "telescoping" peripheral seal structures. The exposed edges of the steel flanges are TIG welded to unitize and finally seal the battery. A ceramic sealant (e.g., silane binder with MgO) is applied over the edge weld to encapsulate the battery stack within an MgO shell.

Example 3—Peripheral Seal with Coated Steel Current Collector

A structure is formed, as in Example 2, with the substitution of a ceramic-coated steel cup for the molybdenum bipolar plate. Components are arranged as in the design shown in FIG. 2B by stacking. The bipolar plate 78 (negative side) has a foil of silver braze (92.5% Ag 7.5% Cu) between it and the bipolar plate 76 (positive side). The bipolar plate 76 (positive side) has a conductive ceramic coating of $CaAl_2S_4$ with 30 wt. % Mo powder applied to its upper surface as a paint. The ceramic ring 74 is a single composition of $CaAl_2S_4$ with 18 wt. % CaO, and is positioned onto the bipolar plate 76 (positive side). The negative peripheral ring 72 of steel is positioned onto the ceramic peripheral ring 74. This structure is bonded together within an Ar atmosphere furnace at 1100° C. for ½ hour. About 5 g/cm² weight is applied to maintain component positions. The silver braze bonds the two sides of the bipolar plate 76, 78; and the conductive ceramic fuses to coat the inner surface of the bipolar plate. As viewed by metallography, bonding is achieved in all axes, and the inner surface of the bipolar plate is coated with ceramic to protect the steel substrate. Especially at the bipolar plate's edges, the ceramic encapsulates the steel component from exposure to the corrosive environment (molten-salt) internal to the bipolar seal component. The thermal processing anneals the steel components, which aids the reciprocating action of the bipolar plate during battery cycling (i.e. discharge/recharge).

Example 4—Direct Metal/Structural Ceramic Bond

Metals and ceramics with CTE's within approximately 20% of each other have been bonded directly, that is, with only a film of sulfide ceramic between. The coupling of MgO to aluminized steel with $CaAl_2S_4$ was evaluated with the tensile strength test procedure. The bond strength at greater than 35 kg/cm² was about 75% of the metal/metal or ceramic/ceramic bonds. Thin, strong peripheral seals, e.g., the design shown in FIG. 2C are formed by directly bonding metal components within a ceramic ring 82. Steel and coated-steel component are snapped into the ceramic peripheral ring 82. A coating of sulfide ceramic in the gap between the two components can unitize the structure after a 1000° C. processing.

Example 5—Ceramic/Ceramic Welding

A molybdenum surface is bonded to sulfide ceramic by a TIG welder. The arc of a TIG welder is directed to the edge of molybdenum component to supply sufficient heat to locally melt the ceramic, but not melt the molybdenum. Upon melting, the ceramic wets and bonds to the molybdenum. In the design shown in FIG. 2D, the battery 10 is assembled by use of localized heat to fuse the sulfide ceramic sealant 95. Laser welding is a preferred method of fusion.

Example 6—Integrated Dispersed Current-Collector with Planar Sheet, (FIG. 3)

A conductive-sulfide ceramic coating, comprised of $CaAl_2S_4$ with 30 wt. % Mo powder (−200 mesh) is applied to the surfaces of two steel sheet current-collectors as a paint. A carbon-felt is sandwiched between the steel sheets with the painted on coated at the carbon-felt interface. These components are then heated to 1100° C. in an Ar gas atmosphere for 45 minutes with a 5 g/cm² load to position the pieces. As seen by metallography, the outer most ends of the carbon felt structure become bonded to the steel surfaces via the conductive coating. Contact resistance between the steel sheets and carbon felt structure is significantly reduced (by at least ten fold). Electronic conduction between the carbon felt and the steel sheets is not dependent upon incidental contact, but is bonded by joining elements at a depth within the carbon-felt. This transition layer forms a carbon/ceramic composite. Whereas the resistance of the bonded sample (1.0 cm²) was 5 ohms, the unbonded sample was at least 50 ohms. The resistance of the unbonded sample was dependent upon applied pressure, and it nearly looses electrical contact without a compressive load.

Example 7—Electrical Performance of Bipolar Battery

A battery constructed in accordance with the geometry shown in FIG. 2A has the performance characteristic shown in the following table and is compared with an advanced lead acid battery:

TABLE II

| Parameter | Comparison of Lithium/Iron Disulfide with Lead-Acid | |
|---|---|---|
| | Advanced Lead-Acid | Small, Light-Weight Bipolar Li/FeS$_2$ |
| Volume, ft.³ | 5.8 | 2.9 |
| Weight, lb | 870 | 363 |
| Battery Size | 9 × 12 × 93 in. | 9 in. dia × 79 in. |
| Energy Output, kWh | 13.6 | 29 |
| Power Output, kW | 90 | 90 |
| Range, miles | | |
| constant 55 mph | 120 | 256 |
| urban | 124 | 265 |
| Battery Life, cycles | 200 | 1000 |

What is claimed is:

1. A bipolar battery having a plurality of cells with each of said cells comprising:
   a negative electrode;
   a positive electrode and a separator element disposed between said negative electrode and said positive electrode, said separator element electrically insulating said electrodes from one another;
   an electrolyte disposed within at least one of said negative electrode, said positive electrode and said separator element where said electrolyte is in contact with both said electrodes; and
   an electrode containment structure including a cup-like electrode holder, a perimeter metallic seal ring forming a negative electrode compartment and a peripheral ceramic seal ring electrically isolating said positive and negative electrodes.

2. The bipolar battery as defined in claim 1 wherein said negative electrode is selected from the group consisting of an alkaline metal alloy and an alkaline earth alloy.

3. The bipolar battery as defined in claim 1 wherein said positive electrode is selected from the group consisting of at least one chalcogenides.

4. The bipolar battery as defined in claim 2 wherein said metal alloy is selected from the group consisting of lithium alloy, sodium alloy, potassium alloy, calcium alloy, barium alloy and strontium alloy.

5. The bipolar battery as defined in claim 3 wherein said chalcogenide is selected from the group consisting of transition metal chalcogenides and sodium chalcogenides.

6. The bipolar battery as defined in claim 1 wherein said cup-like electrode holder comprises a refractory metal coated steel.

7. The bipolar battery as defined in claim 6 wherein said cup-like electrode holder includes lateral extension elements.

8. The bipolar battery as defined in claim 1 wherein said cup-like electrode holder comprises at least one of a graphite liner over steel and a refractory metal.

9. The bipolar battery as defined in claim 1 wherein said separator element comprises a ceramic material.

10. The bipolar battery as defined in claim 1 wherein said perimeter metallic seal ring further includes a negative electrode seal ring and a negative electrode flange ring.

11. The bipolar battery as defined in claim 6 wherein said cup-like electrode holder includes indentations permitting reciprocating action during cycling of said bipolar battery.

12. The bipolar battery as defined in claim 6 wherein said cup-like holder telescopically couples to the adjoining said cup-like holder and captures the perimeter of said separator element.

13. The bipolar battery as defined in claim 1 further including an external ceramic ring.

14. The bipolar battery as defined in claim 13 wherein said external ceramic ring is bonded to said peripheral ceramic seal ring.

15. The bipolar battery as defined in claim 13 further including an electrically insulating, humidity resistant seal of the opening between successive ones of said external ceramic rings.

16. The bipolar battery as defined in claim 1 further including a supportive peripheral ceramic seal ring.

17. The bipolar battery as defined in claim 1 wherein said peripheral ceramic seal ring comprises a sulfide ceramic.

18. The bipolar battery as defined in claim 1 wherein said electrode containment structure comprises at least two elements.

19. The bipolar battery as defined in claim 1 wherein said electrode containment structure is sealed using a sulfide ceramic material.

20. The bipolar battery as defined in claim 1 further including a dispersed current collecting network bonded to said cup-like electrode holder.

21. A bipolar battery cell, comprising:
a negative electrode;
a positive electrode and a separator element disposed between said negative electrode and said positive electrode, said separator element electrically insulating said electrodes from one another;
an electrolyte disposed within at least one of said negative electrode, said positive electrode and said separator element where said electrolyte is in contact with both said electrodes; and
an electrode containment structure including a cup-like electrode holder comprising a ceramic coating on a metal substrate, a perimeter metallic seal ring forming a negative electrode compartment and a peripheral ceramic seal ring electrically isolating said positive and negative electrodes.

22. The bipolar battery cell as defined in claim 21 wherein said cup-like electrode holder includes an intermetallic layer.

23. The bipolar battery intermetallic layer defined in claim 22 wherein said intermetallic layer is selected from the group consisting of aluminides, silicides and phosphides.

* * * * *